(12) United States Patent
Han et al.

(10) Patent No.: US 10,444,913 B2
(45) Date of Patent: Oct. 15, 2019

(54) DRIVING CIRCUIT, TOUCH DISPLAY APPARATUS, AND METHOD FOR DRIVING TOUCH DISPLAY APPARATUS

(71) Applicant: LG Display Co., Ltd., Seoul (KR)

(72) Inventors: Sungsu Han, Goyang-si (KR); YongChan Park, Seoul (KR); SungChul Kim, Goyang-si (KR); Jinseong Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 3 days.

(21) Appl. No.: 15/480,301

(22) Filed: Apr. 5, 2017

(65) Prior Publication Data

US 2017/0300146 A1    Oct. 19, 2017

(30) Foreign Application Priority Data

Apr. 15, 2016  (KR) ........................ 10-2016-0046027
Sep. 22, 2016  (KR) ........................ 10-2016-0121283

(51) Int. Cl.
*G06F 3/044*  (2006.01)
*G09G 3/20*   (2006.01)
*G06F 3/041*  (2006.01)

(52) U.S. Cl.
CPC ............ *G06F 3/044* (2013.01); *G06F 3/0414* (2013.01); *G09G 3/20* (2013.01); *G09G 3/2092* (2013.01); *G06F 2203/04105* (2013.01); *G06F 2203/04112* (2013.01); *G09G 2300/0426* (2013.01); *G09G 2310/08* (2013.01)

(58) Field of Classification Search
CPC combination set(s) only.
See application file for complete search history.

(56) References Cited

U.S. PATENT DOCUMENTS

| | | | |
|---|---|---|---|
| 7,359,999 B2* | 4/2008 | Sato | G06F 3/0414 345/156 |
| 7,538,760 B2* | 5/2009 | Hotelling | G06F 3/0414 178/18.06 |
| 2011/0141052 A1* | 6/2011 | Bernstein | G06F 3/016 345/174 |
| 2013/0265256 A1* | 10/2013 | Nathan | G06F 3/0414 345/173 |
| 2014/0247239 A1* | 9/2014 | Jamshidi-Roudbari | G06F 3/0414 345/174 |
| 2015/0268783 A1* | 9/2015 | Yoon | G06F 3/0414 345/173 |

(Continued)

*Primary Examiner* — Jose R Soto Lopez
(74) *Attorney, Agent, or Firm* — Fenwick & West LLP

(57) ABSTRACT

The present embodiments relate to a driving circuit and a touch display apparatus for sensing a user's touch position and touch force with respect to a display panel, and further relate to a driving method thereof. The touch display apparatus may include a plurality of first electrodes that are configured to be embedded in a display panel, and a second electrode that is configured to be positioned outside the display panel. The touch display apparatus may read a force sensing signal from the second electrode through a signal detecting unit that is electrically connected to the second electrode. Therefore, it is possible to sense a touch force without separating a force sensing signal from a signal received from the first electrode, and to sense a user's touch force through the driving of the second electrode regardless of the driving mode of the first electrode.

20 Claims, 22 Drawing Sheets

(56) References Cited

U.S. PATENT DOCUMENTS

| | | | |
|---|---|---|---|
| 2016/0062497 A1* | 3/2016 | Huppi | G06F 3/0414 |
| | | | 345/177 |
| 2016/0259481 A1* | 9/2016 | Lee | G02F 1/133345 |
| 2016/0334903 A1* | 11/2016 | Shepelev | G06F 3/044 |
| 2017/0045976 A1* | 2/2017 | Bushnell | G06F 3/0414 |
| 2017/0045992 A1* | 2/2017 | Lee | G06F 3/0416 |
| 2017/0068383 A1* | 3/2017 | Chern | G06F 3/0416 |
| 2017/0102809 A1* | 4/2017 | Son | G06F 3/0414 |
| 2017/0108973 A1* | 4/2017 | Kim | G02F 1/13338 |
| 2017/0123548 A1* | 5/2017 | Shih | G06F 3/0414 |
| 2017/0192596 A1* | 7/2017 | Lee | G01L 1/146 |
| 2017/0199616 A1* | 7/2017 | Kim | G09G 3/3233 |
| 2017/0235400 A1* | 8/2017 | Ding | G06F 3/044 |
| | | | 345/174 |
| 2017/0269773 A1* | 9/2017 | Suzuki | G06F 3/0416 |
| 2017/0277296 A1* | 9/2017 | Reynolds | G06F 3/044 |
| 2017/0293377 A1* | 10/2017 | Hsu | G06F 3/044 |
| 2017/0322674 A1* | 11/2017 | Rosenberg | G06F 3/044 |
| 2017/0371470 A1* | 12/2017 | Nathan | G06F 3/0414 |
| 2018/0025694 A1* | 1/2018 | Al-Dahle | G06F 3/044 |
| | | | 345/174 |
| 2018/0081463 A1* | 3/2018 | Zhang | G02F 1/133308 |
| 2018/0107322 A1* | 4/2018 | Liu | G02F 1/13338 |

* cited by examiner

FIG.5
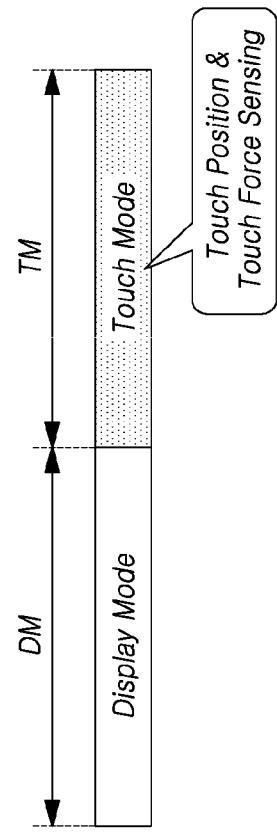
Driving Type A
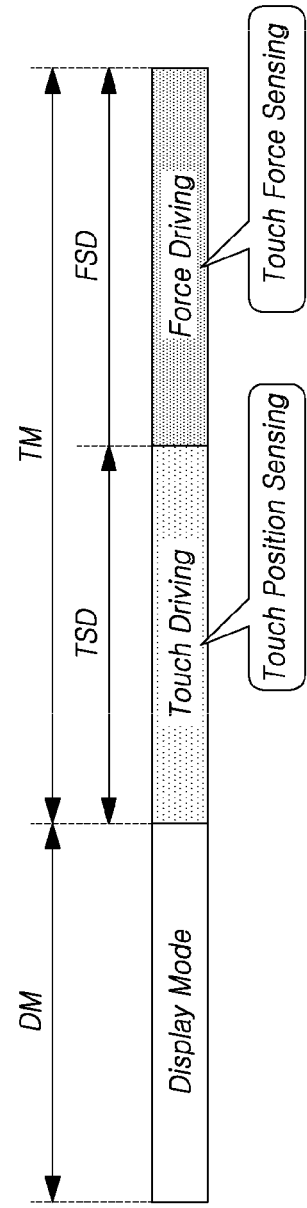
Driving Type B

DRIVING CIRCUIT, TOUCH DISPLAY APPARATUS, AND METHOD FOR DRIVING TOUCH DISPLAY APPARATUS

CROSS REFERENCE TO RELATED APPLICATIONS

This application claims priority under 35 U.S.C. § 119(a) of Republic of Korea Patent Application No. 10-2016-0046027 filed on Apr. 15, 2016, and Republic of Korea Patent Application No. 10-2016-0121283 filed on Sep. 22, 2016, both of which are hereby incorporated by reference in their entirety for all purposes.

BACKGROUND

1. Technical Field

The present embodiments relate to a touch display apparatus, a driving method thereof, and a driving circuit that is included in the touch display apparatus.

2. Description of the Related Art

With the development of information society, there is growing demand for a variety of display devices for displaying images, and various types of display devices have been used, such as a liquid crystal display device, a plasma display device, an organic light emitting display device, or the like.

Among the display devices, mobile devices, such as smart phones or tablets, and medium and large devices, such as a smart television set, provide the touch type of input process according to the user's convenience and device characteristics.

Such a display device capable of processing a touch input is being developed to provide more diverse functions, and user requirements are also becoming more diverse.

However, according to the touch type of input process that is currently applied, only a user's touch position (touch coordinates) is sensed and a related input process is executed in the sensed touch position. Thus, it is too limited to meet the current situation in which a variety of functions are required to be provided in a variety of forms and various user desires are required to be satisfied.

SUMMARY

An aspect of the present embodiments is to provide a driving circuit, a touch display apparatus, and a driving method thereof in which a touch force corresponding to a user's pressing force on a screen, as well as a touch position (touch coordinates), may be sensed when the user touches the screen in order to provide a variety of functions in a variety of forms according to the touch type of input process.

Another aspect of the present embodiments is to provide a touch display apparatus and a driving circuit that adopt a structure for sensing a touch force corresponding to a user's pressing force on a screen when the user touches the screen, and is to further provide a driving method thereof.

Another aspect of the present embodiments is to provide a touch display apparatus and a driving circuit that can perform the sensing of a touch force, which corresponds to a user's pressing force on a screen when the user touches the screen, independently from the sensing of a touch position (touch coordinates), and is to further provide a driving method thereof.

Another aspect of the present embodiments is to provide a driving circuit and a touch display apparatus that can sense a user's touch force in a display driving period in which images/videos are displayed on the screen and a touch sensing period in which a user's touch is sensed alternate with each other, and is to further provide a driving method thereof.

In one aspect, the present embodiments may provide a touch display apparatus that can sense a touch force corresponding to a user's pressing force on a screen, as well as a touch position (touch coordinates), when a user's touch occurs.

The touch display apparatus may include: a plurality of first electrodes configured to be embedded in a display panel; and a second electrode configured to be positioned outside the display panel.

The touch display apparatus may have a gap between the plurality of first electrodes and the second electrode, and the width of the gap may change depending on the magnitude of the touch force.

The touch display apparatus may include a driving circuit configured to sequentially output first electrode driving signals that are applied to at least one of a plurality of first electrodes in a touch sensing period.

The driving circuit may output a second electrode driving signal that is applied to the second electrode in a force sensing period.

Here, the first electrode driving signal may be output as an AC signal, and the second electrode driving signal may be output as a DC signal. Alternatively, the first electrode driving signal may be output as a DC signal, and the second electrode driving signal may be output as an AC signal.

In addition, the driving circuit may receive a touch sensing signal from the plurality of first electrodes in a touch sensing period, and may receive a force sensing signal from the second electrode in a force sensing period.

Here, the force sensing period may coincide with at least a part of a display driving period that does not coincide with the touch sensing period.

Alternatively, the force sensing period may coincide with at least a part of the touch sensing period.

Alternatively, the force sensing period may coincide with at least a part of a period that includes both the display driving period and the touch sensing period, and the force sensing period may coincide with at least one of the display driving period or the touch sensing period.

In another aspect, the present embodiments may provide a driving method for sensing at least one of a touch position (touch coordinates) corresponding to the position at which the user touches a screen or a touch force corresponding to a user's pressing force on a screen when the user touches the screen.

The driving method may include: outputting a first electrode driving signal to a plurality of first electrodes embedded in a display panel in a touch sensing period; receiving a touch sensing signal from the plurality of first electrodes through a signal detecting unit that is electrically connected to the plurality of first electrodes in the touch sensing period; outputting a second electrode driving signal to a second electrode positioned outside the display panel in a force sensing period; and receiving a force sensing signal from the second electrode through the signal detecting unit that is electrically connected to the second electrode in the force sensing period.

In another aspect, the present embodiments may provide a driving circuit for driving a plurality of first electrodes embedded in a display panel and a second electrode positioned outside the display panel.

The driving circuit may include a signal generating unit configured to generate a first electrode driving signal that is applied to a plurality of first electrodes embedded in a display panel in a touch sensing period, and configured to generate a second electrode driving signal that is applied to a second electrode positioned outside the display panel in a force sensing period.

In addition, the driving circuit may include an electrode driving unit configured to output a first electrode driving signal to a plurality of first electrodes in a touch sensing period, and configured to output a second electrode driving signal to a second electrode in a force sensing period.

Furthermore, the driving circuit may include a signal detecting unit configured to receive a touch sensing signal from a plurality of first electrodes in a touch sensing period, and configured to receive a force sensing signal from a second electrode in a force sensing period.

In some embodiments, the signal detecting unit may be electrically connected to a plurality of first electrodes and a second electrode in order to thereby receive a touch sensing signal through a first channel and in order to thereby receive a force sensing signal through a second channel that is different from the first channel.

Alternatively, the signal detecting unit may include: a first signal detecting unit configured to be electrically connected to a plurality of first electrodes so as to receive a touch sensing signal; and a second signal detecting unit configured to be electrically connected to a second electrode so as to receive a force sensing signal.

The signal detecting unit may receive a force sensing signal from a second electrode in a force sensing period that coincides with at least a part of a display driving period that does not coincide with a touch sensing period.

Alternatively, the signal detecting unit may receive a force sensing signal from a second electrode in a force sensing period that coincides with at least a part of a touch sensing period.

Alternatively, the signal detecting unit may receive a force sensing signal from a second electrode in a force sensing period that coincides with at least a part of a period that includes both a display driving period and a touch sensing period.

According to the present embodiments, it is possible to provide a driving circuit, a touch display apparatus, and a driving method thereof in which a touch force corresponding to a user's pressing force on a screen, as well as a touch position (touch coordinates), can be sensed when a user's touch occurs in order to thereby provide a variety of functions in a variety of forms.

In addition, according to the present embodiments, it is possible to provide a touch display apparatus and a driving circuit that adopt a structure for sensing a touch force corresponding to a user's pressing force on a screen when the user touches the screen, and to further provide a driving method thereof.

In addition, according to the present embodiments, it is possible to provide a driving circuit and a touch display apparatus that can perform the sensing of a user's touch force independently from the sensing of a user's touch position (touch coordinates) by receiving a force sensing signal from a second electrode separately from a touch sensing signal received from a plurality of first electrodes, and to further provide a driving method thereof.

In addition, according to the present embodiments, it is possible to provide a driving circuit and a touch display apparatus that can sense a user's touch force in a force sensing period that coincides with at least a part of the display driving period or the touch sensing period by performing the sensing of a user's touch force independently from the sensing of a user's touch position (touch coordinates).

BRIEF DESCRIPTION OF THE DRAWINGS

The above and other objects, features, and advantages of embodiments of the present invention will be more apparent from the following detailed description taken in conjunction with the accompanying drawings, in which:

FIG. 5 is a diagram showing an example of a driving type in a touch mode period in a touch display apparatus, according to an embodiment.

DETAILED DESCRIPTION OF THE EXEMPLARY EMBODIMENTS

Figure 1:
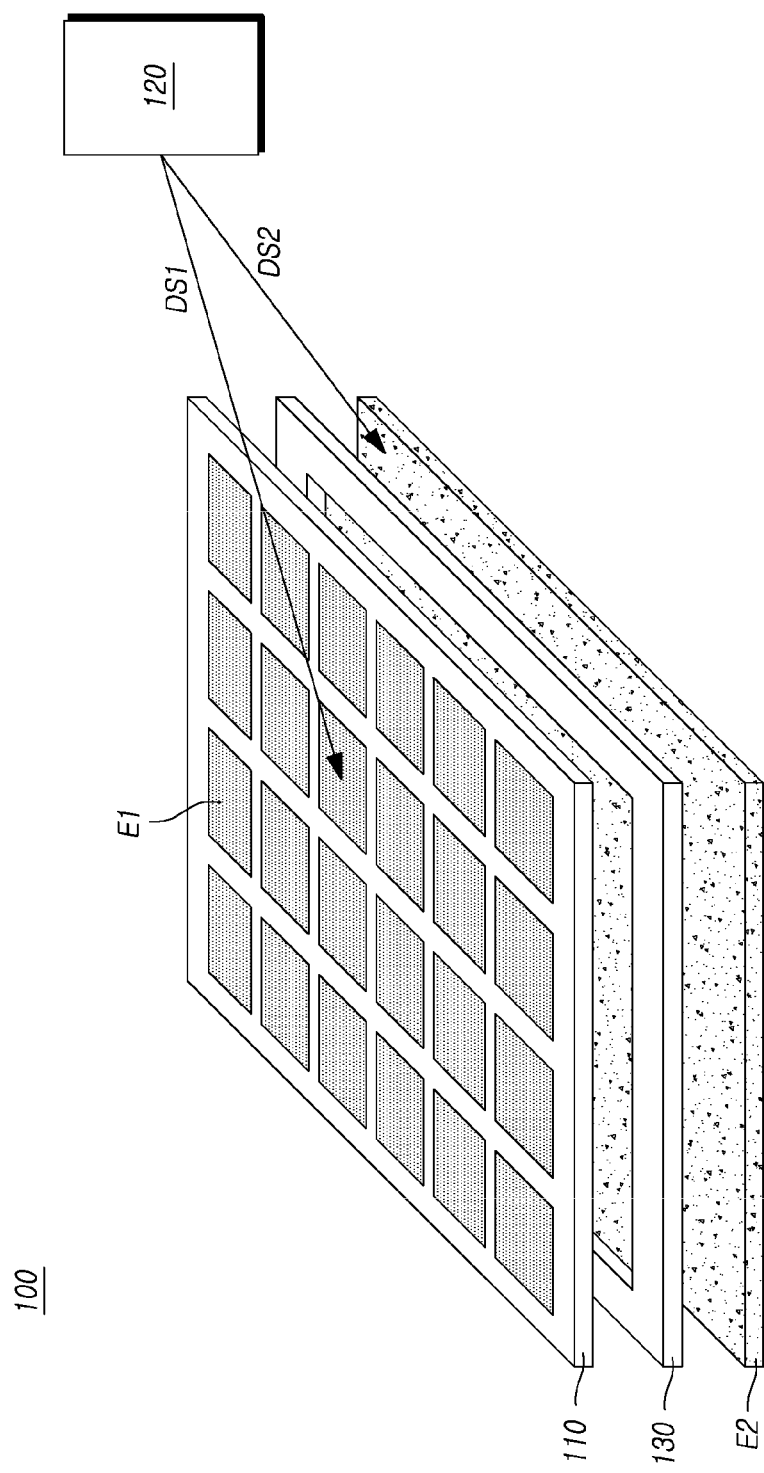
FIGS. 1 and 2 are exploded perspective views showing a schematic configuration of a touch display apparatus, according to one embodiment.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of embodiments of the present invention, a detailed description of known functions and configurations incorporated herein will be omitted when it may make the embodiments of the present invention rather unclear.

In addition, terms, such as first, second, A, B, (a), (b) or the like may be used herein when describing components of embodiments of the present invention. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
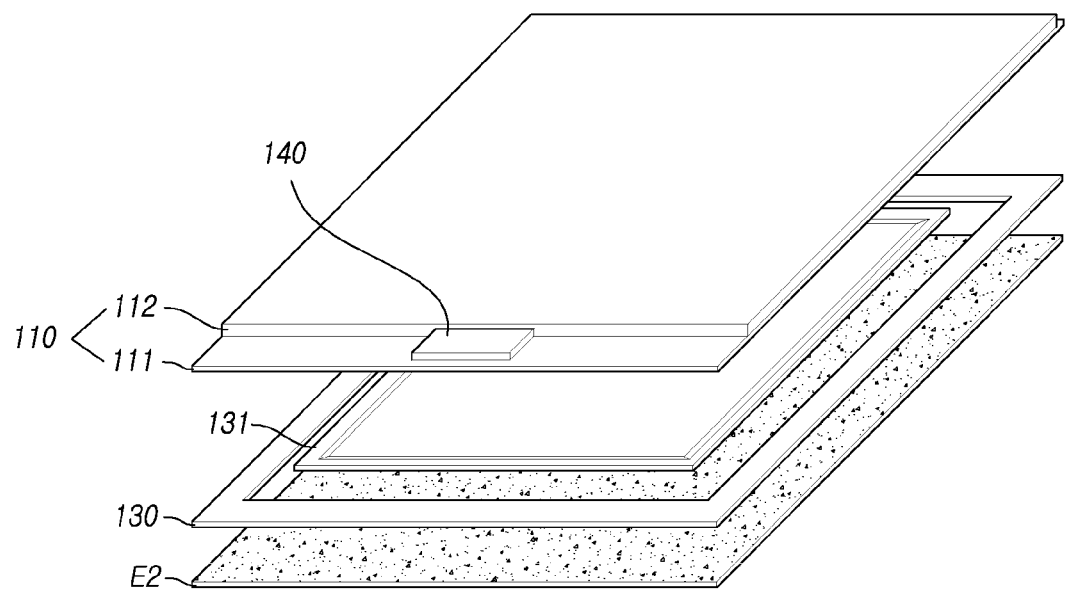

FIGS. 1 and 2 are exploded perspective views showing a schematic configuration of a touch display apparatus 100, according to one embodiment.

Referring to FIG. 1, the touch display apparatus 100, according to an embodiment, may include a plurality of first electrodes (E1) for sensing a user's touch and a touch position (touch coordinates) thereof, a second electrode (E2) for sensing a user's touch force, a display panel 110 in which the plurality of first electrodes (E1) are embedded, a driving circuit 120 for driving the plurality of first electrodes (E1) and the second electrode (E2), and a gap structure unit 130 for maintaining a gap between the plurality of first electrodes (E1) and the second electrode (E2).

The touch display apparatus 100, according to the present embodiments, may operate in a display mode for displaying an image, and may operate in a touch mode for sensing a user's touch (e.g., determining whether or not the user has touched, a touch position, or a touch force).

When the touch display apparatus 100 operates in the display mode, data lines and gate lines that are arranged on the display panel 110 are driven to display an image.

At this time, the plurality of first electrodes (E1), which are embedded in the display panel 110, are applied with a display driving voltage for displaying an image. That is, the plurality of first electrodes (E1) operate as electrodes for driving the display in the display mode period.

When the touch display apparatus 100 operates in the touch mode, a user's touch position (touch coordinates) may be sensed, or a user's touch force may be sensed.

In the touch sensing period for sensing a user's touch position (touch coordinates), the driving circuit 120 applies a first electrode driving signal (DS1) to the plurality of first electrodes (E1) in sequence to thereby sense the user's touch position (touch coordinates).

In the force sensing period for sensing a user's touch force, the driving circuit 120 applies the first electrode driving signal (DS1) to the plurality of first electrodes (E1) in sequence, and applies a second electrode driving signal (DS2) to the second electrode (E2) in order to thereby sense the user's touch force.

The sensing of the user's touch position (touch coordinates) and the sensing of the user's touch force may be simultaneously performed in the touch mode period, or the touch mode period may be time-divided, and the touch position (touch coordinates) sensing and the touch force sensing may be performed in different time periods.

The touch display apparatus 100, according to the present embodiments, senses a user's touch force by detecting a change in the gap between the plurality of first electrodes (E1) and the second electrode (E2) when a user's vertical load occurs with respect to the display panel 110.

Thus, a gap is required between the plurality of first electrodes (E1) embedded in the display panel 110 and the second electrode (E2) positioned outside the display panel 110, and a gap structure unit 130 may be disposed between the plurality of first electrodes (E1) and the second electrode (E2) in order to maintain the gap.

That is, with such a gap structure unit 130, since the size of the gap between the plurality of first electrodes (E1) and the second electrode (E2) may be changed when a user's touch occurs, it is possible to sense a user's touch force as well as the user's touch position (touch coordinates).

Hereinafter, the structure of the touch display apparatus 100, according to the present embodiments, will be described in more detail with reference to FIG. 2.

Referring to FIG. 2, the display panel 110 of the touch display apparatus 100, according to an embodiment, may be comprised of a first substrate 111 in which a thin film transistor (TFT) or the like is disposed and a second substrate 112 in which a color filter (CF) or the like is disposed.

In addition, a driving chip 140 may be mounted, bonded, or connected to an edge portion (e.g., a non-active region) of the first substrate 111.

Here, the driving chip 140 may be a chip that implements the whole or a part of the driving circuit 120, a data driving chip, or a display driving chip that includes the whole or a part of the driving circuit 120 and the data driving chip.

A lower structure 131 may be positioned under the display panel 110, and the second electrode (E2) may be positioned under or inside the lower structure 131.

The lower structure 131, for example, may be a back light unit of a liquid crystal display device.

In this case, the second electrode (E2) may be positioned under the back light unit. According to this, the second electrode (E2) may be disposed so as not to interfere with a light illumination function of the back light unit.

The gap structure unit 130 may be positioned under, inside, or on the side of the lower structure 131. In addition, the second electrode (E2) may be positioned under or inside the gap structure unit 130.

As described above, it is possible to implement a touch force sensing structure that is suitable to the design structure of the display panel 110 and the touch display apparatus 100 by variously designing the position of the second electrode (E2) or the position of the gap structure unit 130.

Hereinafter, a method in which the touch display apparatus 100, according to the present embodiments, senses a user's touch force will be described with reference to FIGS. 3 and 4, and for the convenience of explanation, the description will be made of an example in which the touch display apparatus 100, according to the present embodiments, is a liquid crystal display device.

Figure 3:
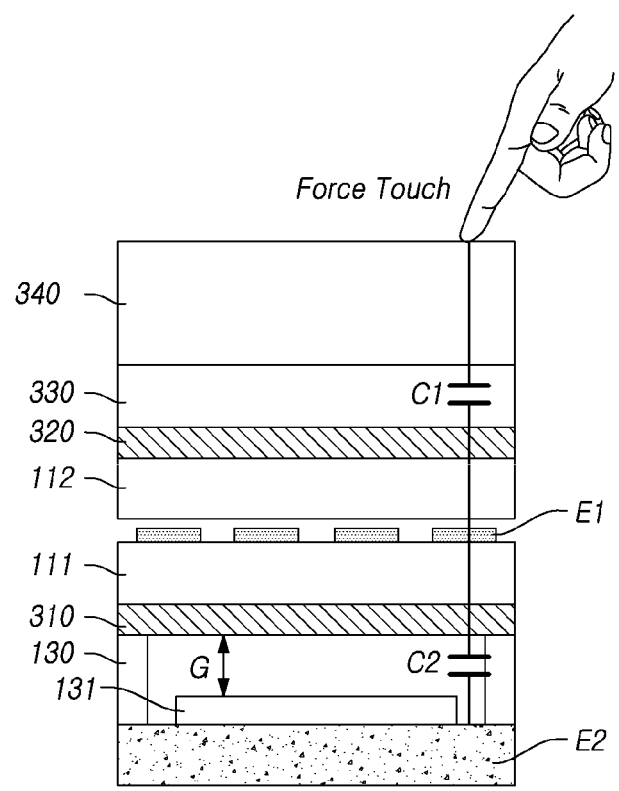
FIG. 3 is a view showing a cross-section of a touch display apparatus, according to an embodiment.
Figure 4:
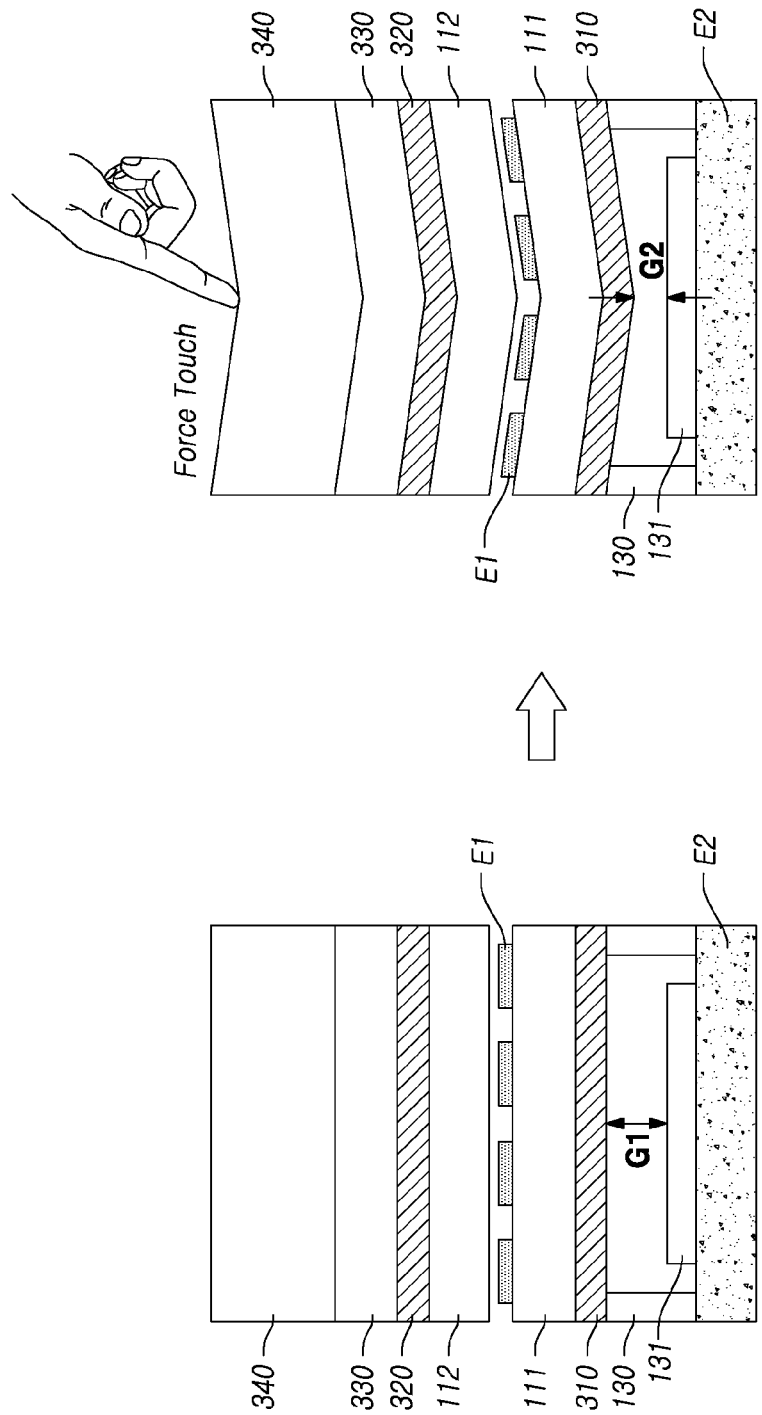
FIG. 4 is a view showing the state in which a gap varies by means of a touch force in a touch display apparatus, according to an embodiment.

FIG. 3 shows a cross-section of the touch display apparatus 100, according to an embodiment, and FIG. 4 shows the state in which a gap between the plurality of first electrodes (E1) and the second electrode (E2) varies by a user's touch with respect to the touch display apparatus 100.

Referring to FIG. 3, the display panel 110 of the touch display apparatus 100 includes a first polarizing plate 310, a first substrate 111, a plurality of first electrodes (E1), a second substrate 112, a second polarizing plate 320, and the like. In addition, a bonding layer 330 and an upper cover 340 are positioned on the display panel 110.

The touch display apparatus 100 may sense a user's touch position (touch coordinates) by sensing a change in the first capacitance (C1) between the plurality of first electrodes (E1) and a conductive pointer, such as a user's finger, when a user's touch occurs.

A lower structure 131 may be positioned under the display panel 110, and the lower structure 131 may be an existing structure of the touch display apparatus 100, or may be a separate structure that is provided for the second electrode (E2).

For example, the lower structure 131 may be a back light unit or a rear cover of a liquid crystal display device.

The touch display apparatus 100 may sense a user's touch force by sensing a change in the second capacitance (C2) depending on a change in the gap between the plurality of first electrodes (E1) and the second electrode (E2) when a vertical load is generated by a user's touch.

Referring to FIG. 4, when a vertical load is generated by a user's touch, the upper cover 340 and the display panel 110 are slightly bent downwards.

According to this, the size of a gap (G), such as an air gap or a dielectric gap, that is positioned between the first electrode (E1) and the second electrode (E2) may vary.

If G1 refers to a gap (G) before the vertical load is generated by a user's touch and G2 refers to a gap (G) after the vertical load is generated by a user's touch, G2 becomes smaller than G1 because of the vertical load.

As described above, as the gap (G) is reduced from G1 to G2 due to the occurrence of the vertical load by a user's touch, the second capacitance (C2) varies in order to thereby sense a user's touch force.

FIG. 5 shows an example of the driving type depending on a display mode period (or a display driving period) in which the touch display apparatus 100, according to an embodiment, operates in a display mode and depending on a touch mode period in which the touch display apparatus 100 senses a user's touch position (touch coordinates) and touch force.

In the touch display apparatus 100, according to one embodiment, since a plurality of first electrodes (E1) that are embedded in the display panel 110 operate as display driving electrodes in the display mode, and operate as electrodes for the touch sensing in the touch mode, the display mode period and the touch mode period are separated from each other.

In the touch mode, a user's touch position (touch coordinates) and touch force may be simultaneously sensed, or may be sensed through a time-division according to the driving type of the plurality of first electrodes (E1) and the second electrode (E2).

The driving type A shows the case in which the user's touch position (touch coordinate) and touch force are sensed at the same time.

The driving circuit 120 applies a first electrode driving signal (DS1) to the plurality of first electrodes (E1) and applies a second electrode driving signal (DS2) to the second electrode (E2) in the touch mode in order to thereby simultaneously sense the user's touch position (touch coordinate) and touch force.

The driving type B shows the case in which the user's touch position (touch coordinate) and touch force are sensed through a time-division.

The driving circuit 120 applies the first electrode driving signal (DS1) to the plurality of first electrodes (E1) in the touch sensing period of the touch mode in order to thereby sense the user's touch position (touch coordinate). In addition, the driving circuit 120 applies the first electrode driving signal (DS1) to the plurality of first electrodes (E1) and applies the second electrode driving signal (DS2) to the second electrode (E2) in the force sensing period of the touch mode in order to thereby sense the user's touch force.

At this time, in order to sense the touch force, the driving circuit 120 drives the plurality of first electrodes (E1) and the second electrode (E2), and senses the touch force from a signal that is received from the plurality of first electrodes (E1).

Thus, since the signal received from the plurality of first electrodes (E1) includes both a touch sensing signal and a force sensing signal, an operation of separating the force sensing signal from the signals received from the plurality of first electrodes (E1) is required to be performed.

Figure 6:
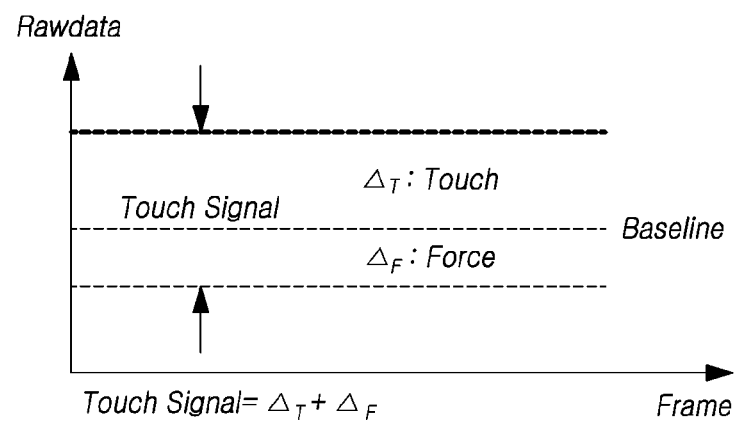
FIG. 6 is a diagram showing an example of sensing data that is obtained in the touch mode period of FIG. 5 by the touch display apparatus, according to an embodiment.

FIG. 6 shows an example of a signal that the driving circuit 120 receives from the plurality of first electrodes (E1), where the signal may include both a touch sensing signal and a force sensing signal.

Referring to FIG. 6, when no user's touch occurs, the magnitude of a signal that is received from the plurality of first electrodes (E1) is shown by a baseline.

When a user's touch occurs, a signal received from the first electrode (E1) by a user's touch has a positive (+) value based on the baseline.

In addition, when a user's touch force occurs, a signal that is received from the first electrode (E1) has a negative (−) value based on the baseline.

Therefore, since the signal received from the plurality of first electrodes (E1) includes the amount of change $\Delta_T$ caused by the user's touch and the amount of change $\Delta_F$ caused by the user's touch force, an operation of separating a force sensing signal from the signal received from the first electrode (E1) is required in order to sense the user's touch force.

The present embodiments provide a method for sensing the touch force, as well as the user's touch position (touch coordinates), in the touch display apparatus 100, and further provide a method for sensing the user's touch force independently from the touch position (touch coordinates).

Figure 7:
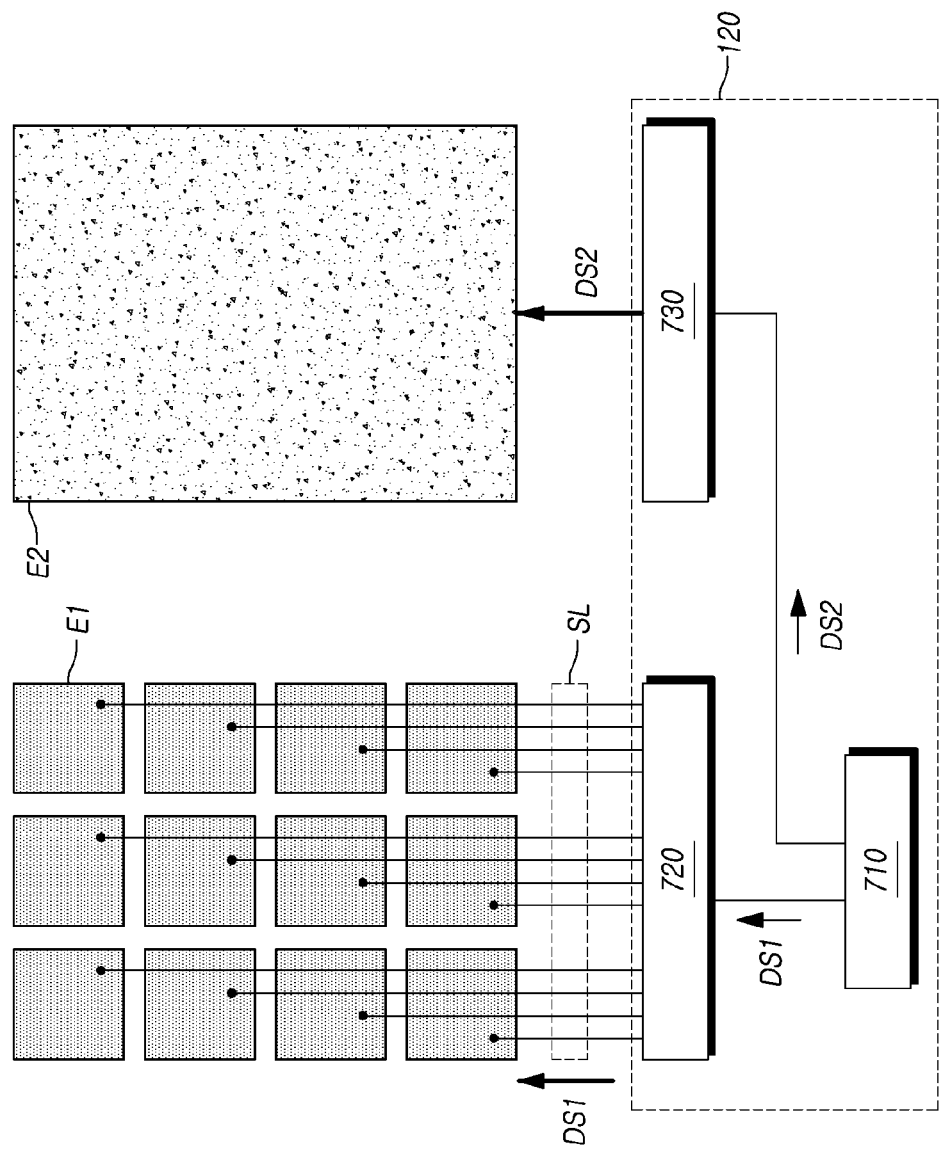
FIGS. 7 and 8 are views showing examples of the configuration for outputting a first electrode driving signal and a second electrode driving signal in a touch display apparatus, according to an embodiment.
Figure 8:
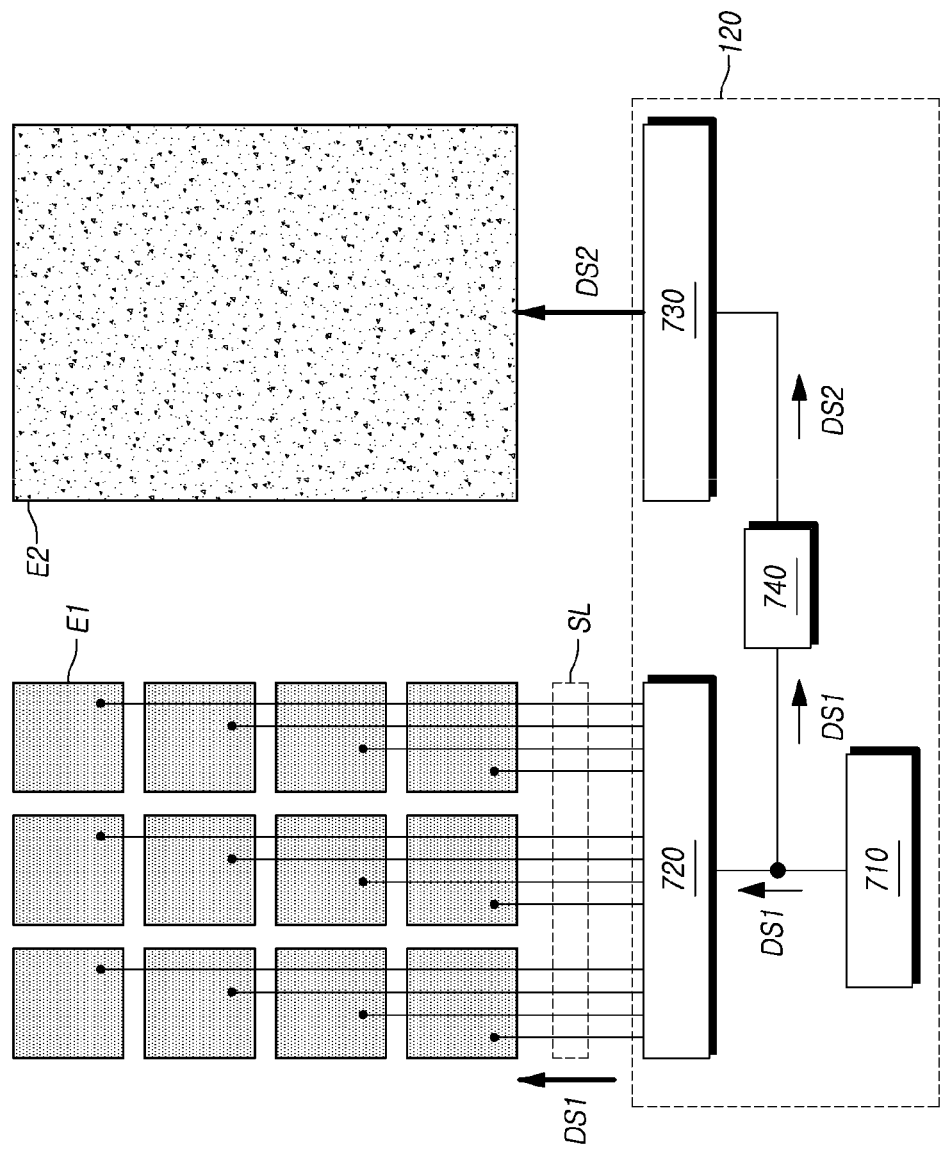

FIGS. 7 and 8 show examples of the configuration in which the driving circuit 120 of the touch display apparatus 100, according to the present embodiments, drives the plurality of first electrodes (E1) and the second electrode (E2).

Referring to FIG. 7, the driving circuit 120, according to an embodiment, may include: a signal generating unit 710 that generates the first electrode driving signal (DS1) for driving the plurality of first electrodes (E1) and the second electrode driving signal (DS2) for driving the second electrode (E2); a first electrode driving unit 720 for applying the first electrode driving signal (DS1) to the plurality of first electrodes (E1) in the touch sensing period; and a second electrode driving unit 730 for applying the second electrode driving signal (DS2) to the second electrode (E2) in the force sensing period.

The signal generating unit 710 may generate and output the second electrode driving signal (DS2), as well as the first electrode driving signal (DS1), in order to thereby facilitate the driving in the touch mode period by using the second electrode driving signal (DS2) that has a different form from the first electrode driving signal (DS1).

The first electrode driving unit 720 may include an integrator, an analog-to-digital converter (ADC), and the like.

The first electrode driving unit 720 may apply the first electrode driving signal (DS1) to the plurality of first electrodes (E1) in the touch sensing period, and may apply a display driving voltage to the plurality of first electrodes (E1) in the display mode period.

The second electrode driving unit 730 may be implemented by at least one printed circuit in which signal wirings are disposed to transfer the second electrode driving signal (DS2) to the second electrode (E2), and may apply the second electrode driving signal (DS2) to the second electrode (E2) in the force sensing period.

FIG. 8 shows another example of the configuration of the driving circuit 120, wherein the driving circuit 120 includes a signal conversion unit 740, as well as a signal generating unit 710, a first electrode driving unit 720, and a second electrode driving unit 730.

Referring to FIG. 8, the signal generating unit 710 generates the first electrode driving signal (DS1) for driving the plurality of first electrodes (E1). In addition, the signal generating unit 710 transfers the first generated electrode driving signal (DS1) to the signal conversion unit 740.

The signal conversion unit 740 generates the second electrode driving signal (DS2) by converting the first electrode driving signal (DS1) generated by the signal generating unit 710, and transfers the second generated electrode driving signal (DS2) to the second electrode driving unit 730.

The signal conversion unit 740 may generate the second electrode driving signal (DS2) by converting the amplitude or phase of the first electrode driving signal (DS1).

The signal conversion unit 740 may include a level shifter for controlling the signal voltage level, or may include a phase controller for controlling a signal phase. Further, the signal conversion unit 740 may include a DA converter for converting a DC signal into an AC signal (e.g., pulse signal) or an AD converter for converting an AC signal (e.g., pulse signal) into a DC signal.

That is, when the first electrode driving signal (DS1) is generated as an AC signal, the second electrode driving signal (DS2) may be converted into a DC signal to be output. Alternatively, when the first electrode driving signal (DS1) is generated as a DC signal, the second electrode driving signal (DS2) may be converted into an AC signal to be output.

Since the signal generating unit 710 generates the first electrode driving signal (DS1) in embodiments including the signal conversion unit 740, without necessarily having to generate a second electrode driving signal, it is possible to reduce the signal generation load and to provide more effective touch driving.

Figure 9:
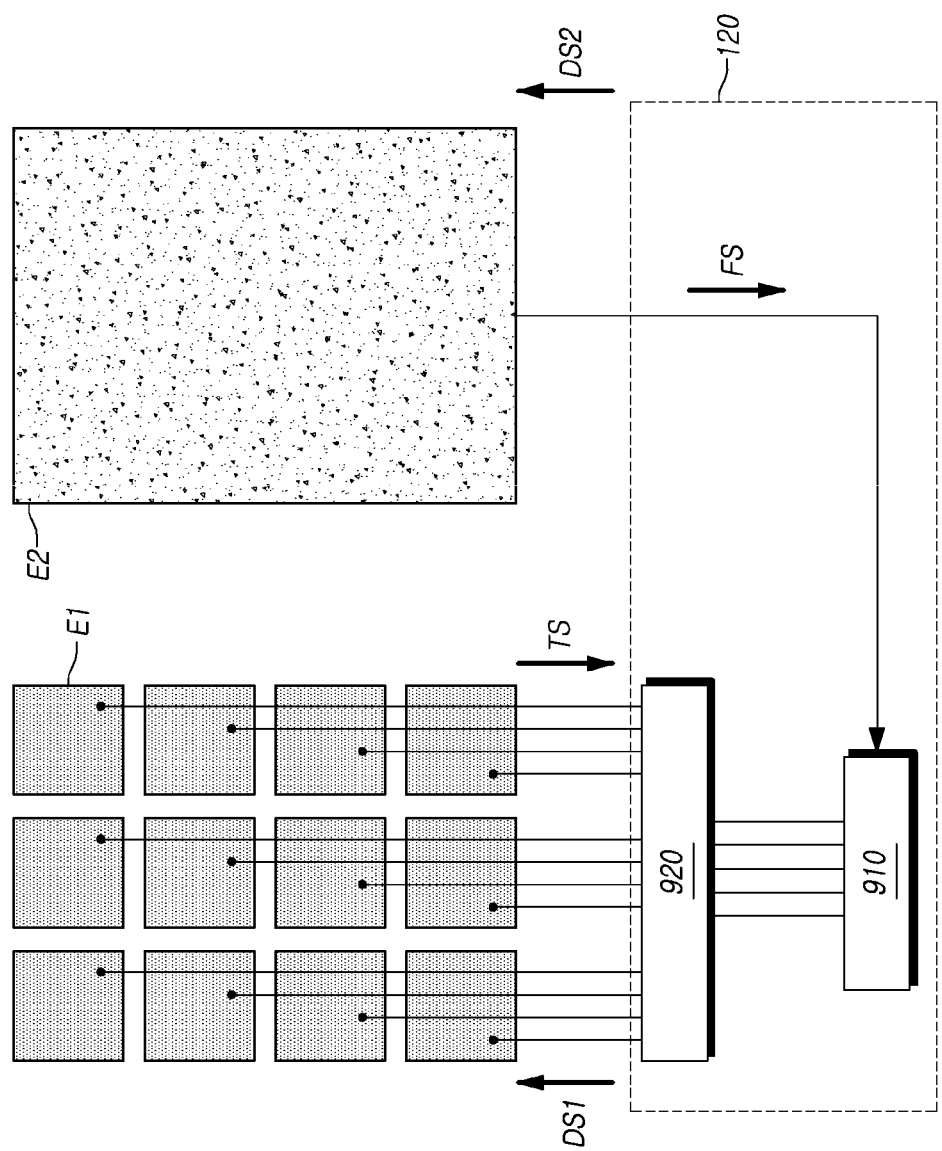
FIGS. 9 and 10 are views showing examples of the configuration for receiving a touch sensing signal and a force sensing signal in a touch display apparatus, according to an embodiment.
Figure 10:
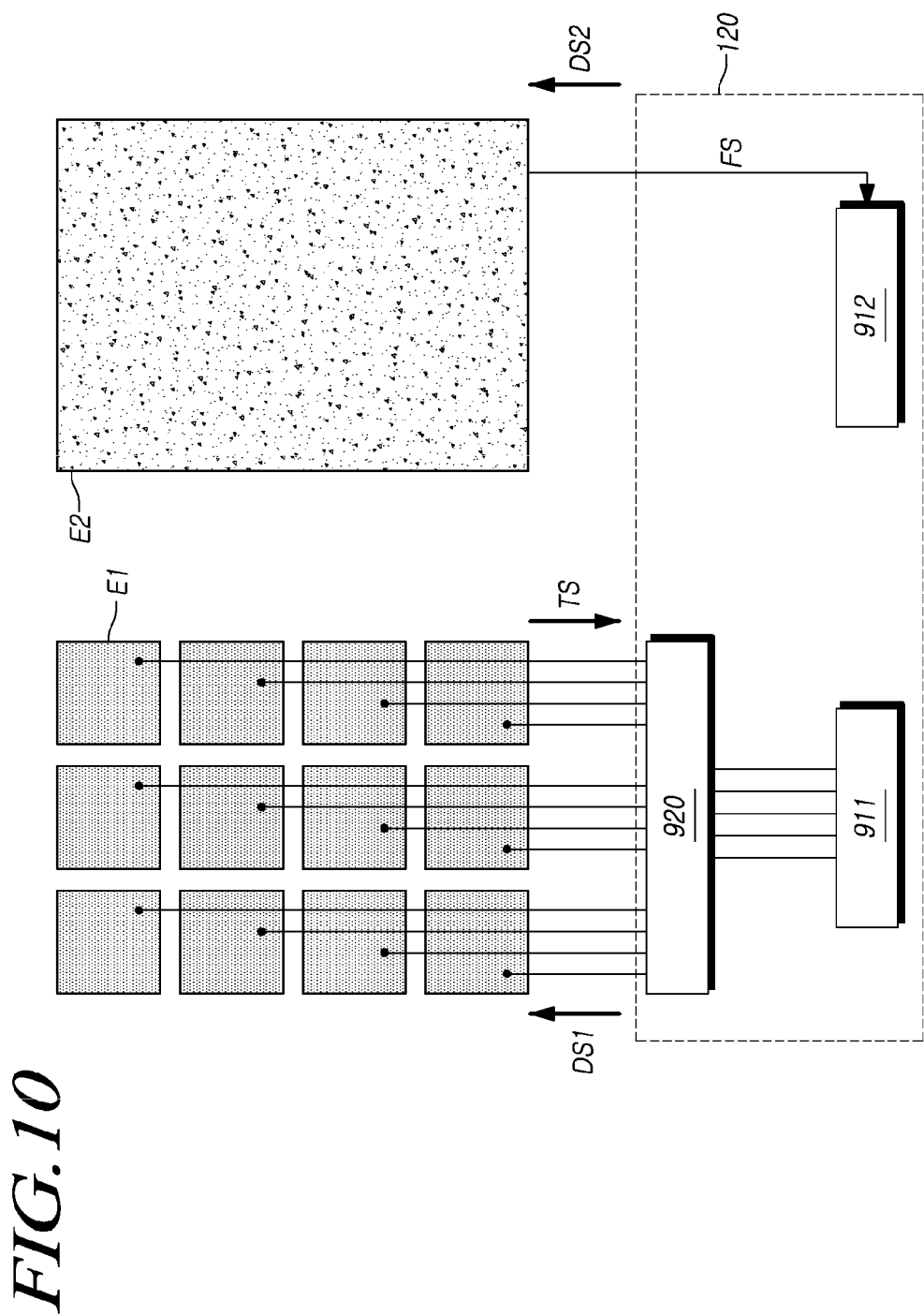

FIGS. 9 and 10 show examples of the configuration in which the driving circuit 120 of the touch display apparatus 100, according to the present embodiments, receives a touch sensing signal and a force sensing signal.

Referring to FIG. 9, the driving circuit 120, according to an embodiment, may include a signal detecting unit 910 and a multiplexer 920.

The signal detecting unit 910 may be electrically connected to a plurality of first electrodes (E1) so as to receive a touch sensing signal from the plurality of first electrodes (E1) in the touch sensing period. That is, the signal detecting unit 910 may receive a touch sensing signal that is generated by a user's touch while the first electrode driving unit 720 outputs the first electrode driving signal (DS1) to the plurality of first electrodes (E1).

In addition, the signal detecting unit 910 may receive a force sensing signal from the second electrode (E2) while being electrically connected to the second electrode (E2) in the force sensing period. That is, the signal detecting unit 910 may receive a force sensing signal that is generated by a user's touch force while the second electrode driving unit 730 outputs the second electrode driving signal to the second electrode (E2).

Such a signal detecting unit 910 may be an analog front end (AFE), and may allocate channels of the analog front end (AFE) to receive a touch sensing signal through some channels and to receive a force sensing signal through other channels.

Alternatively, the driving circuit 120 may include a plurality of signal detecting units 910, and different signal detecting units 910 that are electrically connected to the plurality of first electrodes (E1) and the second electrode (E2) may read a touch sensing signal received from the plurality of first electrodes (E1) and a force sensing signal received from the second electrode (E2).

FIG. 10 illustrates an example in which the driving circuit 120, according to an embodiment, includes a plurality of signal detecting units 910.

Referring to FIG. 10, the driving circuit 120, according to an embodiment, may include a first signal detecting unit 911 that receives a touch sensing signal from a plurality of first electrodes (E1) and a second signal detecting unit 912 that receives a force sensing signal from the second electrode (E2).

The first signal detecting unit 911 may be configured to be electrically connected to the plurality of first electrodes (E1) to read a touch sensing signal received from the plurality of first electrodes (E1) and to sense the user's touch position (touch coordinates).

The second signal detecting unit 912 may be configured to be electrically connected to the second electrode (E2) to read a force sensing signal received from the second electrode (E2) and to sense the user's touch force.

Therefore, according to the present embodiments, it is possible to read a force sensing signal received from the second electrode (E2), separately from a touch sensing signal received from the first electrode (E1), through the signal detecting unit 910 that is electrically connected to the second electrode (E2) by allocating the channels of the signal detecting unit 910 included in the driving circuit 120 or by using a plurality of signal detecting units 910.

Accordingly, since the user's touch force is sensed by using the force sensing signal that is received from the second electrode (E2), there is an advantage in which an operation of separating the force sensing signal from the touch sensing signal received from the first electrode (E1) is not required.

Figure 11:
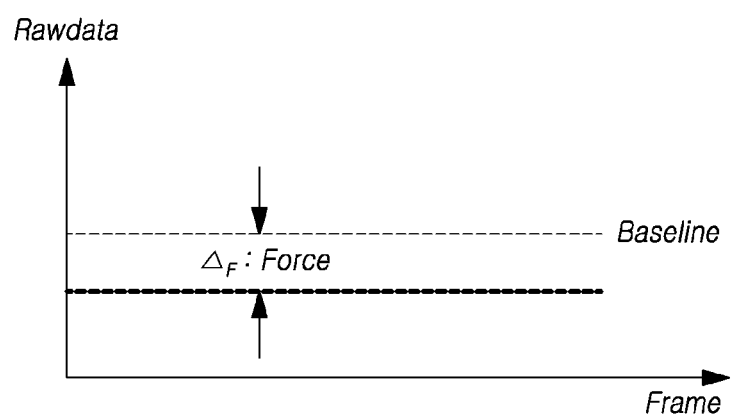
FIG. 11 is a diagram showing an example of sensing data that is obtained in a force sensing period of a touch display apparatus in the configuration of FIG. 9 or 10, according to an embodiment.

FIG. 11 shows an example of the magnitude of a force sensing signal that is received from the second electrode (E2) by means of the signal detecting unit 910 of the driving circuit 120, according to an embodiment.

Referring to FIG. 11, since a force sensing signal is received from the second electrode (E2) through the signal detecting unit 910 that is electrically connected to the second electrode (E2) in the driving circuit 120, the amount of change $\Delta_F$ caused by a user's touch force may be obtained.

Meanwhile, according to the present embodiments, since a force sensing signal is received from the second electrode (E2) through the signal detecting unit 910 that is electrically connected to the second electrode (E2) in the driving circuit 120 to sense a touch force, it is possible to allocate the force sensing period independently from the touch sensing period.

Hereinafter, the description will be made of a method in which the touch display apparatus 100, according to the present embodiments, allocates the force sensing period with reference to FIGS. 12 to 21.

FIGS. 12 to 16 are waveform diagrams that show examples of allocating the force sensing period when the touch display apparatus 100 operates in the display mode and the touch mode by an LHB driving method.

In the LHB driving method, for example, the display driving and the touch driving are performed with respect to some electrodes of the plurality of first electrodes (E1), and then, the display driving and the touch driving are performed in sequence with respect to all of the electrodes.

Thus, a plurality of display mode periods and touch mode periods may alternate in a single frame. Here, the touch mode period refers to a period that includes at least one of the touch sensing period or the force sensing period.

Figure 12:
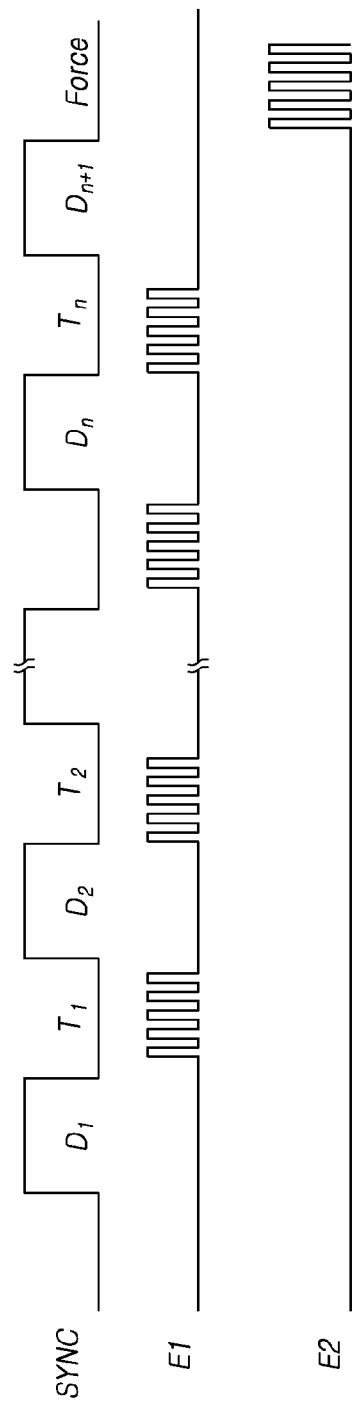
FIGS. 12 to 16 are waveform diagrams illustrating examples in which a touch display apparatus allocates a display driving period, a touch sensing period, and a force sensing period, according to an embodiment.

Referring to FIG. 12, the touch display apparatus 100 operates in the display mode in the period of a high-level synchronization signal (SYNC), and operates in the touch mode in the period of a low-level synchronization signal (SYNC) based on the synchronization signal (SYNC).

Alternatively, the touch display apparatus 100 may operate in the display mode in the period of a low-level synchronization signal (SYNC), and may operate in the touch mode in the period of a high-level synchronization signal (SYNC).

The driving circuit 120 applies a display driving voltage to a plurality of first electrodes (E1) in the display mode period to allow the plurality of first electrodes (E1) to operate as display driving electrodes.

The driving circuit 120 applies the first electrode driving signal (DS1) to the plurality of first electrodes (E1), and receives a touch sensing signal from the plurality of first electrodes (E1) to sense a user's touch position (touch coordinates) in the touch sensing period during the touch mode period.

The driving circuit 120 applies the second electrode driving signal (DS2) to the second electrode (E2), and receives a force sensing signal from the second electrode (E2) to sense a user's touch force in the force sensing period other than the touch sensing period during the touch mode period.

Since the driving circuit 120 of the touch display apparatus 100, according to the present embodiments, receives a force sensing signal from the second electrode (E2) through the signal detecting unit 910 that is electrically connected to the second electrode (E2), it is possible to sense the user's touch force without receiving a touch sensing signal from the plurality of first electrodes (E1) in the force sensing period.

In addition, since the second electrode (E2) is driven independently from the first electrode (E1) to sense the user's touch force, it is possible to allocate the force sensing period without being affected by the touch sensing period or the display mode period.

Figure 13:
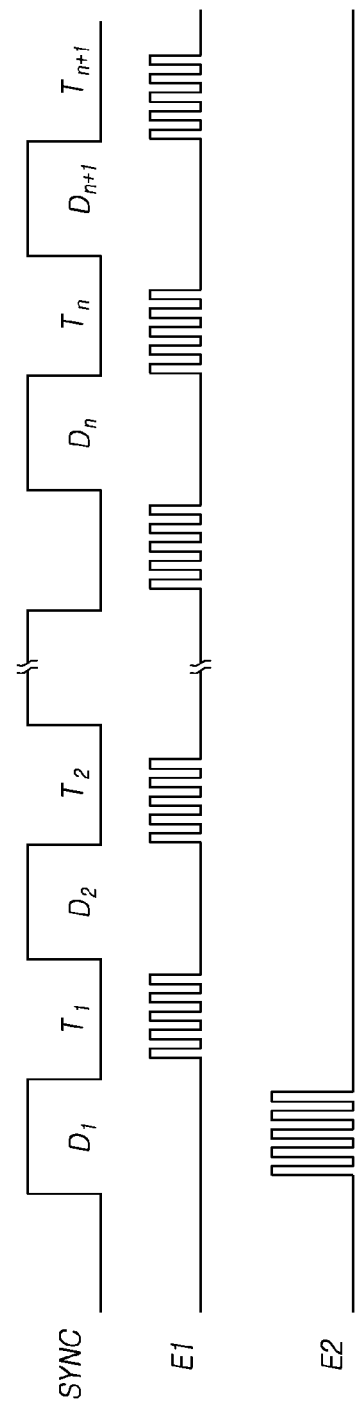

FIG. 13 shows an example in which the force sensing period is allocated to coincide with the display mode period in the touch display apparatus 100, according to an embodiment.

Referring to FIG. 13, the force sensing period may be allocated to at least a part of the display mode period.

Although FIG. 13 illustrates that the force sensing period is allocated to a part of the display mode period, the force sensing period may be allocated to the full duration of the display mode period to sense the touch force, in some embodiments.

Therefore, it is possible to sense the user's touch force while the display driving is performed.

For example, if the display mode period coincides with the force sensing period, the plurality of first electrodes (E1) are applied with a display driving voltage and the second electrode (E2) is applied with the second electrode driving signal (DS2) in the display mode period.

The signal detecting unit 910 included in the driving circuit 120 may read a force sensing signal from the second electrode (E2) in the force sensing period in order to thereby sense the user's touch force even while the display driving is performed.

In addition, since the force sensing period may be allocated independently from the touch sensing period, it may be allocated to coincide with at least a part of the touch sensing period.

Figure 14:
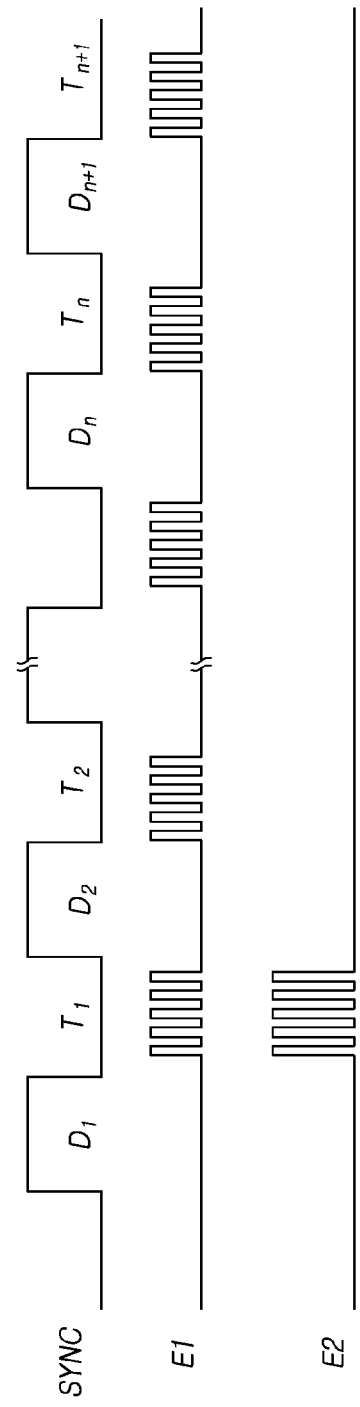

FIG. 14 shows an example in which the force sensing period is allocated to coincide with at least a part of the touch sensing period.

Referring to FIG. 14, in the touch sensing period within the touch mode period, a plurality of first electrodes (E1) are applied with the first electrode driving signal (DS1), and the driving circuit 120 receives a touch sensing signal from the plurality of first electrodes (E1) to sense a user's touch position (touch coordinates).

In addition, in the force sensing period that is allocated to coincide with the touch sensing period, the second electrode driving signal (DS2) is applied to the second electrode (E2) and a force sensing signal is received from the second electrode (E2).

Therefore, the force sensing signal is read from the second electrode (E2) separately from the touch sensing signal received from the first electrode (E1), and the amount of change in the second capacitance (C2) caused by the user's vertical load is sensed from the force sensing signal to sense a user's touch force.

According to this, it is possible to sense the user's touch force without performing an operation of separating the force sensing signal from the touch sensing signal received from the plurality of first electrodes (E1).

Figure 15:
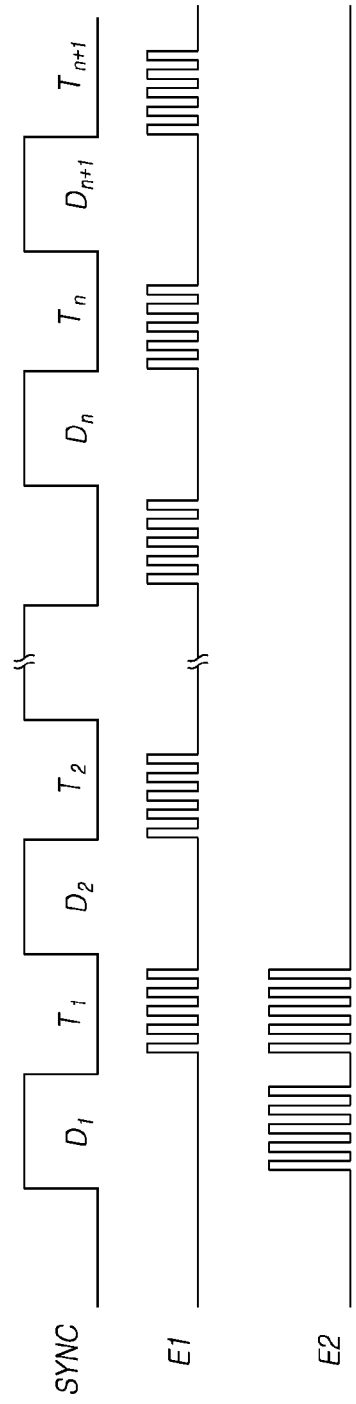

FIG. 15 illustrates the case where the force sensing period is allocated to coincide with both the display mode period and the touch sensing period.

Referring to FIG. 15, the force sensing period may be allocated to coincide with at least a part of the display mode section and to coincide with at least a part of the touch sensing period. In other embodiments, the force sensing period may be allocated to coincide with the full duration of both the display mode period and the touch sensing period.

According to an embodiment, the force sensing signal is read from the second electrode (E2) to sense the user's touch force in the force sensing period in order to thereby sense the user's touch force in both the display mode period and the touch sensing period.

Although FIGS. 12 to 15 show the case in which both the first electrode driving signal (DS1) and the second electrode driving signal (DS2) are AC signals, the first electrode driving signal (DS1) or the second electrode driving signal (DS2) may be a DC signal.

Figure 16:
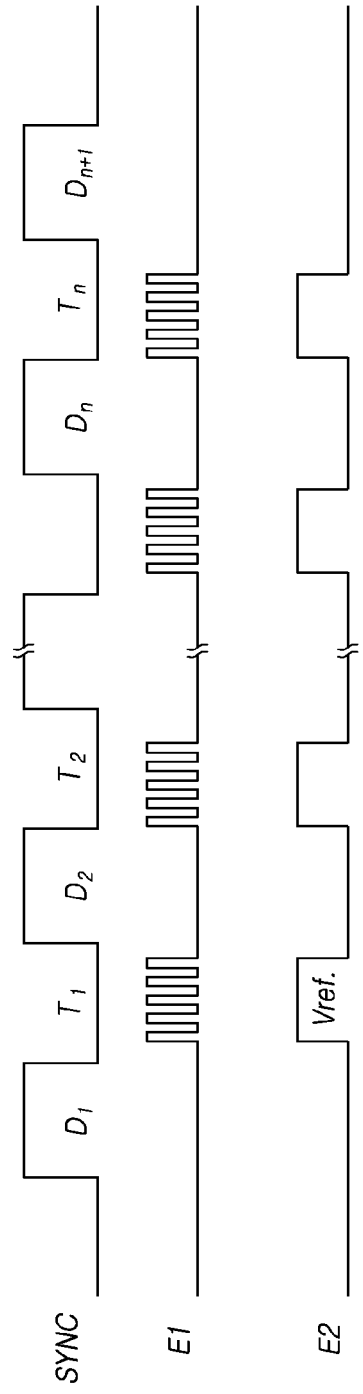

Referring to FIG. 16, an AC signal is applied as the first electrode driving signal (DS1) to the first electrode (E1) and a DC signal (Vref.) is applied as the second electrode driving signal (DS2) to the second electrode (E2) in the touch mode period.

That is, the signal generating unit 710 of the driving circuit 120 generates the first electrode driving signal (DS1) as an AC signal and the second electrode driving signal (DS2) as a DC signal (Vref.) to apply the same to the first electrode (E1) and second electrode (E2), respectively.

Alternatively, the signal conversion unit 740 of the driving circuit 120 may convert the first electrode driving signal (DS1) to the second electrode driving signal (DS2) to be output so that the first electrode driving signal (DS1) as an AC signal and the second electrode driving signal (DS2) as a DC signal (Vref.) may be applied.

In the state in which an AC signal is applied to the first electrode (E1) and a DC signal (Vref.) is applied to the second electrode (E2) in the touch mode period, the signal detecting unit 910 that is electrically connected to the second electrode (E2) receives a force sensing signal from the second electrode (E2) to sense the user's touch force.

Therefore, it is possible to sense the user's touch force independently from the touch sensing in the touch mode period.

FIGS. 17 to 21 are waveform diagrams that show other examples in which the touch display apparatus 100, according to the present embodiments, allocates the force sensing period, wherein the display mode and the touch mode are driven by a V-blank driving method.

The V-blank driving method refers to a method in which the display driving is performed with respect to a plurality of first electrodes (E1) and the touch driving is performed in a single frame.

Figure 17:
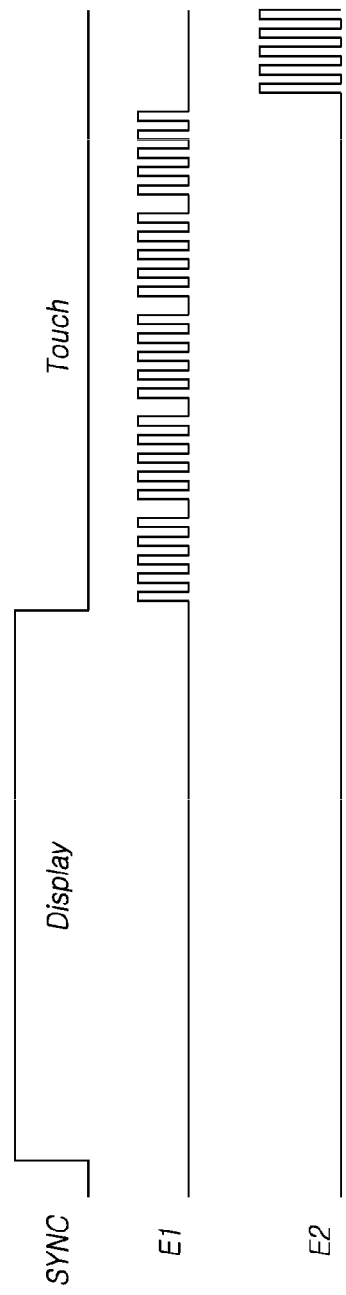
FIGS. 17 to 21 are waveform diagrams illustrating other examples in which a touch display apparatus allocates a display driving period, a touch sensing period, and a force sensing period, according to an embodiments.

Referring to FIG. 17, the display mode is performed in the period of a high-level synchronization signal (SYNC), and the touch mode is performed in the period of a low-level synchronization signal (SYNC).

A plurality of first electrodes (E1) are driven to sense a user's touch position (touch coordinates) in the touch sensing period during the touch mode period, and the second electrode (E2) is driven to sense a user's touch force in the force sensing period that does not coincide the touch sensing period.

Even in the case of the V-blank driving method, the driving circuit 120, according to an embodiment, is able to read a force sensing signal from the second electrode (E2) to sense the user's touch force. Therefore, the force sensing period may be allocated during various periods of time within a frame.

Figure 18:
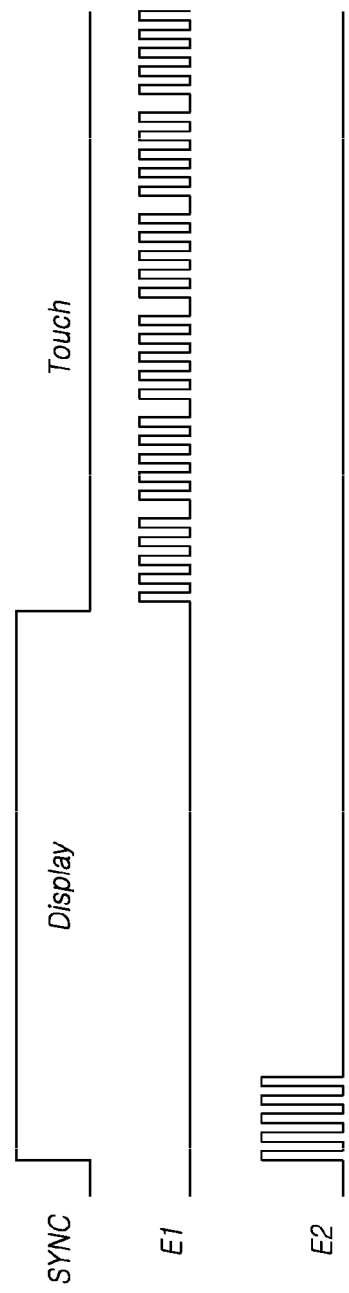

FIG. 18 shows an example in which the force sensing period is allocated to coincide with at least a part of the display mode period.

Referring to FIG. 18, a display driving voltage is applied to a plurality of first electrodes (E1) in the display mode period, and the second electrode (E2) is driven in a force sensing period coinciding with at least a part of the display mode period to sense a user's touch force.

Therefore, it is possible to sense the user's touch force even when the touch display apparatus 100 operates in the display mode.

Figure 19:
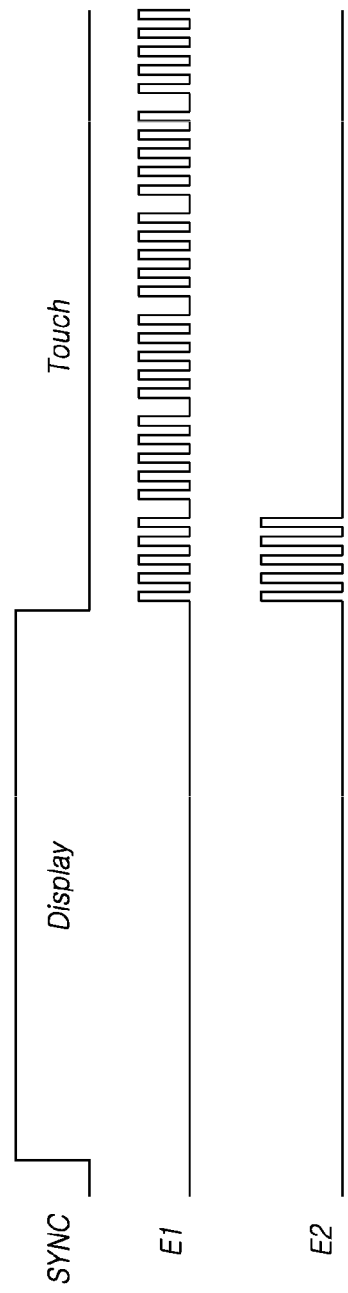

FIG. 19 shows an example in which the force sensing period is allocated to coincide with at least a part of the touch sensing period.

Referring to FIG. 19, the first electrode driving signal (DS1) is applied to the plurality of first electrodes (E1) in the touch sensing period, and the second electrode driving signal (DS2) is applied to the second electrode (E2) in a force sensing period coinciding with at least a part of the touch sensing period.

The driving circuit 120 receives a touch sensing signal from the first electrode (E1) through the signal detecting unit 910 in the touch sensing period, and receives a force sensing signal through the signal detecting unit 910 electrically connected to the second electrode (E2) in the force sensing period.

That is, the touch force may be sensed without performing an operation of separating the force sensing signal from the touch sensing signal received from the first electrode (E1) by sensing the user's touch force through the signal detecting unit 910 that is electrically connected to the second electrode (E2) to read the force sensing signal.

Figure 20:
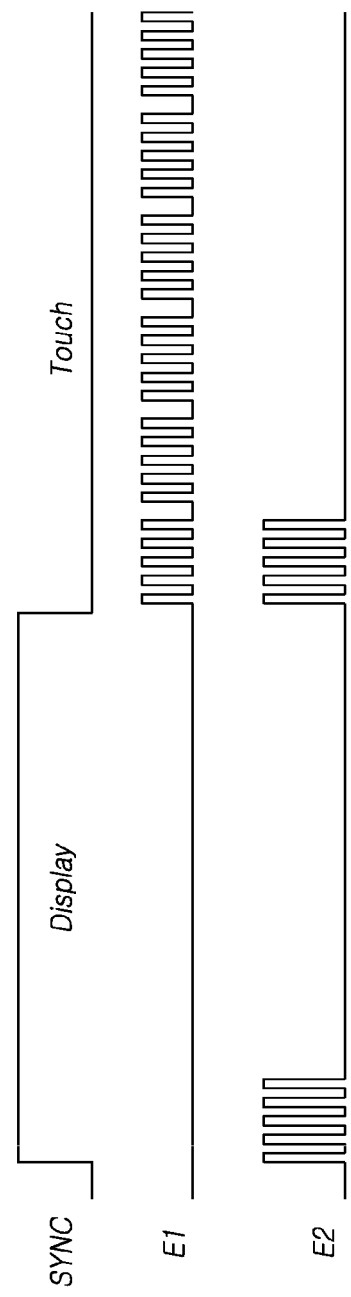

FIG. 20 shows an example in which the force sensing period is allocated to coincide with both the display mode period and the touch sensing period when the touch mode period is driven by a V-blank driving method.

Referring to FIG. 20, the force sensing period may be allocated to coincide with at least a part of both the display mode period and the touch sensing period.

A plurality of first electrodes (E1) are applied with a display driving voltage in the display mode period, and are applied with the first electrode driving signal (DS1) in the touch sensing period.

The second electrode (E2) is applied with the second electrode driving signal (DS2) in the force sensing period regardless of the driving mode of the plurality of first electrodes (E1).

The driving circuit 120 may read a force sensing signal from the second electrode (E2) in the force sensing period to sense a user's touch force. Thus, it is possible to sense the user's touch force in the entire period in which the display mode and touch mode are performed.

Figure 21:
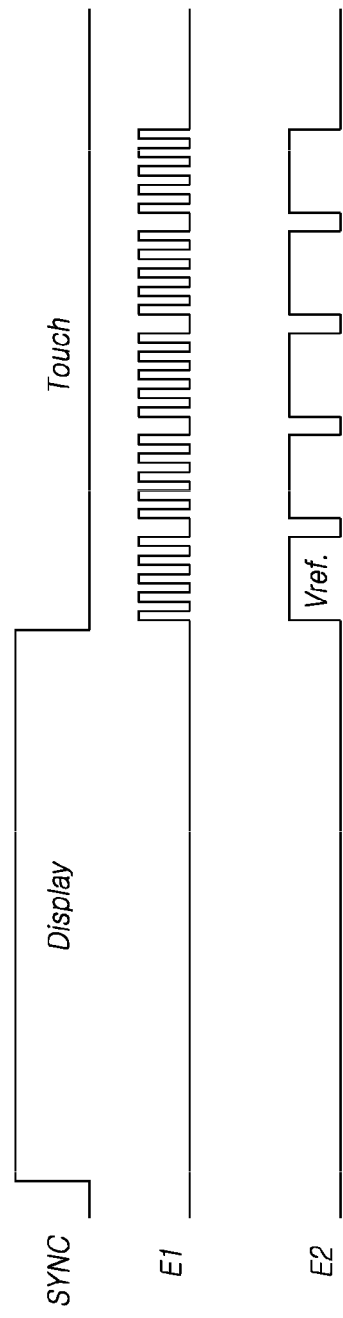

FIG. 21 shows an example in which an AC signal is applied as the first electrode driving signal (DS1) and a DC signal (Vref.) is applied as the second electrode driving signal (DS2) to sense a touch force when the touch mode period is driven by a V-blank driving method.

Referring to FIG. 21, the first electrode (E1) is applied with the first electrode driving signal (DS1) as an AC signal and the second electrode (E2) is applied with the second electrode driving signal (DS2) as a DC signal (Vref.) in the touch mode period.

In addition, a force sensing signal is received from the second electrode (E2) to sense a user's touch force.

That is, the period for sensing the user's touch force may be configured independently from the period for sensing the touch position (touch coordinates), and an AC signal or a DC signal (Vref.) may be applied to the second electrode (E2) to sense the user's touch force.

Therefore, according to the present embodiments, it is possible to sense the touch force without performing an operation of separating the force sensing signal from the touch sensing signal received from the first electrode (E1) by receiving the force sensing signal from the second electrode (E2) through the signal detecting unit 910 electrically connected to the second electrode (E2) in the driving circuit 120.

In addition, since the force sensing period can be allocated regardless of the driving mode of the first electrode (E1), the touch force may be sensed even during the display driving because the force sensing period can be allocated to the same period as the display mode period and the touch sensing period.

Figure 22:
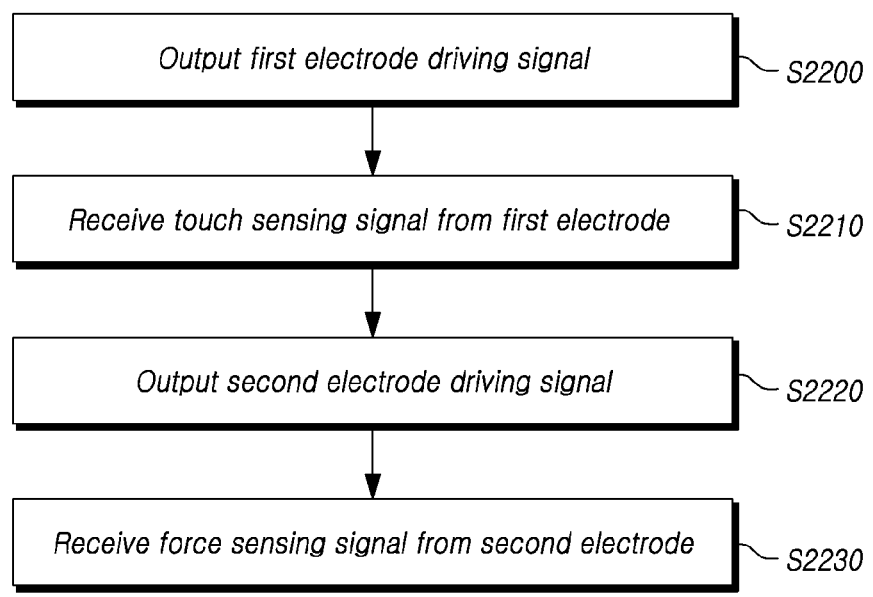
FIG. 22 is a flowchart showing a method of driving a touch display apparatus, according to an embodiment.

FIG. 22 shows a driving method of the touch display apparatus 100, according to an embodiment.

Referring to FIG. 22, the driving circuit 120 of the touch display apparatus 100, according to an embodiment, outputs the first electrode driving signal (DS1) to a plurality of first electrodes (E1) in the touch sensing period (S2200).

The driving circuit 120 receives a touch sensing signal from the plurality of first electrodes (E1) through the signal detecting unit 910 that is electrically connected to the plurality of first electrodes (E1) in the touch sensing period (S2210). The driving circuit 120 senses whether or not the user has touched and senses a touch position (touch coordinates) from the touch sensing signal received from the plurality of first electrodes (E1).

The driving circuit 120 outputs the second electrode driving signal (DS2) to the second electrode (E2) in the force sensing period (S2220).

In addition, the driving circuit 120 receives a force sensing signal from the second electrode (E2) through the signal detecting unit 910 that is electrically connected to the second electrode (E2) (S2230).

Since the driving circuit 120 is able to read the amount of change in the second capacitance (C2) from the force sensing signal received from the second electrode (E2), it may sense the user's touch force without performing an operation of separating a force sensing signal from a touch sensing signal.

According to the present embodiments, it is possible to provide a touch display apparatus 100 that does not only sense whether or not the user has touched and a touch position (touch coordinates) with respect to the display panel 110 but also senses a user's touch force thereof.

In addition, it is possible to sense a touch force without performing an operation of separating a force sensing signal from a touch sensing signal received from the first electrode (E1), for example, by receiving a force sensing signal from the second electrode (E2) through the signal detecting unit 910 that is electrically connected to the second electrode (E2).

In addition, it is possible to sense a touch force even while the touch display apparatus 100 operates in the display mode, for example, by allocating the force sensing period to the display mode period rather than the touch sensing period because the sensing of the touch force is performed independently from the sensing of the touch position (touch coordinates).

Furthermore, it is possible to effectively perform the sensing of the user's touch force, for example, by allocating the force sensing period to coincide with at least a part of both the display mode period and the touch sensing period.

Although the exemplary embodiments of the present invention have been described for illustrative purposes, those skilled in the art will appreciate that various modifications and substitutions are possible, without departing from the scope and spirit of the invention as disclosed in the accompanying claims. Therefore, the exemplary embodiments disclosed are intended to illustrate the scope of the technical idea of the present invention, and the scope of embodiments of the present invention is not limited by the exemplary embodiments.

What is claimed is:

1. A touch display apparatus comprising:
   a plurality of first electrodes configured to be embedded in a display panel;
   one second electrode configured to be positioned outside the display panel, and configured to be spaced apart from the plurality of first electrodes; and
   a driving circuit configured to output a first electrode driving signal to the plurality of first electrodes and to receive a touch sensing signal from the plurality of first electrodes in a touch sensing period, and configured to output a second electrode driving signal independent of the first electrode driving signal to the second electrode and at least one of a display driving voltage, the first electrode driving signal, and a first force sensing signal different from the second electrode driving signal to at least one of the plurality of first electrodes and to receive a second force sensing signal independent of the touch sensing signal from the second electrode in a force sensing period.

2. The touch display apparatus according to claim 1, wherein the driving circuit comprises a signal detecting unit configured to be electrically connected to the plurality of first electrodes and the second electrode, and configured to receive the touch sensing signal and the second force sensing signal, and wherein the signal detecting unit is configured to receive the touch sensing signal through a first channel in the touch sensing period, and is configured to receive the second force sensing signal through a second channel that is different from the first channel in the force sensing period.

3. The touch display apparatus according to claim 1, wherein the driving circuit comprises:
   a first signal detecting unit configured to be electrically connected to the plurality of first electrodes, and configured to receive the touch sensing signal from the plurality of first electrodes in the touch sensing period; and
   a second signal detecting unit configured to be electrically connected to the second electrode, and configured to receive the second force sensing signal from the second electrode in the force sensing period.

4. The touch display apparatus according to claim 1, wherein the force sensing period coincides with at least a part of a display driving period that does not coincide with the touch sensing period.

5. The touch display apparatus according to claim 1, wherein the force sensing period coincides with at least a part of the touch sensing period.

6. The touch display apparatus according to claim 1, wherein the force sensing period coincides with at least a part of both (i) a display driving period that does not coincide with the touch sensing period and (ii) the touch sensing period.

7. The touch display apparatus according to claim 1, wherein the force sensing period does not coincide with the touch sensing period.

8. The touch display apparatus according to claim 1, wherein the first electrode driving signal is an AC signal, and the second electrode driving signal is a DC signal.

9. A method for driving a touch display apparatus that includes a plurality of first electrodes that are embedded in a display panel and one second electrode that is positioned outside the display panel, the method comprising:
   outputting a first electrode driving signal to the plurality of first electrodes in a touch sensing period;
   receiving a touch sensing signal from the plurality of first electrodes through a signal detecting unit, that is electrically connected to the plurality of first electrodes and the second electrode, in the touch sensing period;
   outputting a second electrode driving signal independent of the first electrode driving signal to the second electrode and at least one of a display driving voltage, the first electrode driving signal, and a first force sensing signal different from the second electrode driving signal to at least one of the plurality of first electrodes in a force sensing period; and
   receiving a second force sensing signal independent of the touch sensing signal from the second electrode through the signal detecting unit in the force sensing period.

10. The method according to claim 9, wherein the force sensing period coincides with at least a part of a display driving period that does not coincide with the touch sensing period.

11. The method according to claim 9, wherein the force sensing period coincides with at least a part of the touch sensing period.

12. The method according to claim 9, wherein the force sensing period coincides with at least a part of both (i) a display driving period that does not coincide with the touch sensing period and (ii) the touch sensing period.

13. The method according to claim 9, wherein the first electrode driving signal is an AC signal, and the second electrode driving signal is a DC signal.

14. A driving circuit comprising:
- a signal generating unit configured to generate a first electrode driving signal that is applied to a plurality of first electrodes embedded in a display panel in a touch sensing period, and configured to generate a second electrode driving signal that is applied to a second electrode positioned outside the display panel in a force sensing period;
- an electrode driving unit configured to output the first electrode driving signal to the plurality of first electrodes in the touch sensing period, and configured to output the second electrode driving signal independent of the first electrode driving signal to the second electrode and at least one of a display driving voltage, the first electrode driving signal, and a first force sensing signal different from the second electrode driving signal to at least one of the plurality of first electrodes in the force sensing period; and
- a signal detecting unit configured to receive a touch sensing signal from the plurality of first electrodes in the touch sensing period, and configured to receive a second force sensing signal independent of the touch sensing signal from the second electrode in the force sensing period.

15. The driving circuit according to claim 14, wherein the signal detecting unit is configured to be electrically connected to the plurality of first electrodes and the second electrode, and is configured to receive the touch sensing signal from the plurality of first electrodes through a first channel in the touch sensing period and to receive the second force sensing signal from the second electrode through a second channel that is different from the first channel in the force sensing period.

16. The driving circuit according to claim 14, wherein the signal detecting unit comprises:
- a first signal detecting unit configured to be electrically connected to the plurality of first electrodes, and configured to receive the touch sensing signal from the plurality of first electrodes in the touch sensing period; and
- a second signal detecting unit configured to be electrically connected to the second electrode, and configured to receive the second force sensing signal from the second electrode in the force sensing period.

17. The driving circuit according to claim 14, wherein the signal detecting unit is configured to receive the second force sensing signal from the second electrode in the force sensing period that coincides with at least a part of a display driving period that does not coincide with the touch sensing period.

18. The driving circuit according to claim 14, wherein the signal detecting unit is configured to receive the second force sensing signal from the second electrode in the force sensing period that coincides with at least a part of the touch sensing period.

19. The driving circuit according to claim 14, wherein the signal detecting unit is configured to receive the second force sensing signal from the second electrode in the force sensing period that coincides with at least a part of both (i) a display driving period that does not coincide with the touch sensing period and (ii) the touch sensing period.

20. The driving circuit according to claim 14, wherein the signal generating unit generates an AC signal as the first electrode driving signal, and generates a DC signal as the second electrode driving signal.

* * * * *